United States Patent [19]

Bruelle

[11] 4,289,790

[45] Sep. 15, 1981

[54] SIZZLING AND CRUNCHY CHOCOLATE CANDY

[75] Inventor: Georges Bruelle, Paris, France

[73] Assignee: General Foods France S.A., Rueil Malmaison, France

[21] Appl. No.: 124,029

[22] Filed: Feb. 25, 1980

[51] Int. Cl.$^3$ ............................................. A23G 3/00
[52] U.S. Cl. ...................................... 426/93; 426/96; 426/103; 426/303; 426/305; 426/306; 426/660
[58] Field of Search ................... 426/5, 103, 96, 660, 426/306, 305, 303, 93

[56] References Cited

U.S. PATENT DOCUMENTS

| | | | |
|---|---|---|---|
| 1,255,638 | 2/1918 | Reed | 426/660 |
| 1,402,004 | 1/1922 | Moch | 426/660 |
| 1,606,950 | 11/1926 | Edison | 426/660 |
| 4,150,161 | 4/1979 | Rudolph | 426/5 |

*Primary Examiner*—Jeanette M. Hunter
*Attorney, Agent, or Firm*—Daniel J. Donovan; Thomas R. Savoie

[57] ABSTRACT

A storage-stable confection which does not require moisture resistant packaging is prepared by coating a crunchy core of cereal, dried fruit or nuts with alternate layers of chocolate and gasified candy. This confection provides three organoleptic effects of crunchiness, sizzle and chocolate flavor.

14 Claims, No Drawings

SIZZLING AND CRUNCHY CHOCOLATE CANDY

BACKGROUND OF THE INVENTION

1. Field of the Invention

The invention has for its object a confection having a crunchy center surrounded with a chocolate covering or fantasy of the type known in the trade by the expression "sweet coated centers" and its process of preparation.

It concerns a confection of the kind in question comprising several constituents as well as a process for the manufacture of said confection. It concerns more particularly a confection having several constituents which produces the following combination of organoleptic effects: crackling, crunchy character and taste of fruits, mint and/or chocolate, obtained with the use of either natural or artificial flavors.

The confection conforming to the invention comprises a crunchy center surrounded with alternating layers of gasified candy and of a substance selected among the group consisting of natural chocolate, a chocolate substitute having the same physical properties as chocolate and the taste of chocolate, and a chocolate substitute having the same physical properties as chocolate without having its taste, but which possesses a taste of fruit or mint, obtained with the use of natural or artificial flavors.

As used hereinafter in the specification and claims, "chocolate" means natural chocolate or a chocolate substitute having the same physical properties as chocolate and the taste of chocolate or a chocolate substitute having the same physical properties as chocolate and a taste of fruits or mint, obtained with the use of artificial or natural flavors.

2. Description of the Prior Art

Gasified candy is a hard candy containing a gas, such as carbon dioxide, as disclosed in U.S. Pat. Nos. 3,012,893 of Kremzner and Mitchell; 3,985,909 and 3,985,910 of Kirkpatrick and 4,001,457 of Hegadorn which are incorporated herein by reference. Such a candy is made by the process which comprises melting crystalline sugar, contacting such sugar with gas at a pressure of 50 to 1,000 psig for a time sufficient to permit incorporation in said sugar of 0.5 to 15 ml. of gas per gram of sugar, maintaining the temperature of said sugar during said adsorption above the solidification temperature of the melted sugar, and cooling said sugar under pressure to produce a solid amorphous sugar containing the gas. Upon the release of the pressure the solid gasified candy fractures into granules of assorted sizes.

The resultant product contains 1% to 5% water and most typically 2% to 3% water by weight of the total composition. (All percentage figures herein are in terms of weight percent, unless expressly stated otherwise.) Lower levels of moisture are not practicably obtainable because the additional heat necessary to drive off the water causes the candy melt to caramelize or burn, resulting in an off-flavor, undesirable product. Higher moisture levels result in a soft, sticky matrix which rapidly liberates the entrapped gas and is thus not storage stable.

The gasified candy when placed in the mouth produces an entertaining but short-lived popping or sizzling sensation. As the candy is wetted in the mouth, the candy melts and the gas escapes. The tingling effect in the mouth is sensational but short.

In order to store the granules of gasified candy, they must be isolated from any source of free water which would soften the candy and allow the trapped gas to escape. Gasified candy, therefore, is packaged in moisture resistant containers, viz., metal foil lined sealed envelopes.

When the solidified gasified candy is fractured into granulated pieces by the release of pressure from the preparation vessel, the resultant product is sieved to remove the fines. The larger, more uniformly, sized pieces are packaged for commercial use but a commercial use has not been found for the fines of carbonated candy. Attempts to form the fines into tablet form have proven unsuccessful.

It is an object of this invention to provide confection compositions of several components, including gasified candy.

It is another object of this invention to provide gasified candy in a form which will not require moisture resistant packaging.

It is a further object of this invention to utilize gasified candy fines in a confection composition.

It is still another object of this invention to provide additional confections that provide a variety of sensory effects including a sizzling or popping mouthfeel sensation.

SUMMARY OF THE INVENTION

According to the present invention, it has been found that a confection combining the three following organoleptic effects, i.e., sizzling, crunchy character and the taste of chocolate, fruits or mint can be prepared by surrounding a crunchy center comprising a substance selected from among cereals, dried fruits or oily fruits of the nut type, with alternating layers of a sizzling product comprising granules of gasified candy and a substance capable of providing a residual moisture content less than, or equal to, that of the gasified candy and melting at the temperature of the human body while remaining solid at a temperature which is slightly lower than the temperature of the human body, and which can be selected from the group consisting of natural chocolate, a chocolate substitute having the same physical properties and taste as chocolate, or a chocolate substitute having the same physical properties as chocolate without having its taste.

By "oily fruits of the nut type" is meant in the following description not only walnuts but also hazel nuts, chestnuts, cashews, almonds, pecans, pistachios, and the like.

In particular, the present invention concerns a confection combining three organoleptic effects of crunchiness, sizzle and chocolate flavor which is prepared by coating a crunchy core of cereal, dried fruit or nuts with alternate layers of chocolate, and granulated gasified candy. More particularly, this invention is directed to a confection which comprises (a) a crunchy core comprising cereal, dried fruit, nuts or mixtures thereof, and (b) a protective matrix coating formed on said core, said coating comprising alternate layers of chocolate and gasified candy, the innermost and outermost layers of said coating being chocolate.

This invention is also directed to a method of preparing a confection which comprises (a) forming a crunchy core comprising cereal, dried fruit, nuts or mixtures thereof, and (b) applying alternate layers of chocolate and gasified candy to said crunchy core, the innermost and outermost layers being chocolate.

DESCRIPTION OF THE PREFERRED EMBODIMENTS

The present invention relates to a confection which provides a combination of organoleptic effects, crunchiness, sizzle and chocolate taste. Although the confection contains gasified candy, moisture resistant packaging of this product is not required to provide storage stability as has been required heretofore with gasified candy.

Briefly, the confection consists of a crunchy core surrounded by alternate layers of chocolate and gasified candy with the final layer being chocolate. Optionally, a layer of edible shellac or varnish may be applied over the final coating of chocolate.

The core may be prepared from a variety of edible materials but those employed must provide a crunchy texture to the confection when it is eaten. Such edibles as cereal, dried fruits or nuts can provide the core with the desired degree of crunchiness. Useful cereals prepared from such grains as rice, wheat, corn, oats and barley may be employed. These may be in expanded or exploded form or may have been processed so as to produce a cereal with the necessary crunchy texture. Those skilled in the art will appreciate that the core may be prepared from many of the commercially-available breakfast cereals. Popcorn may also serve as a material for the core. Dried fruits may also be used to prepare the crunchy core, including for example, prunes, raisins and coconut. Nuts having the desired crunchy texture are usefully employed in the core of this confection, for example, chestnuts, hazel nuts, peanuts, walnuts, almonds, pecans, etc. These useful materials may be utilized alone or in combination with one or more of the other cereals, dried fruits or nuts.

Although the crunchy core may be coated directly with chocolate, the fats in the chocolate will in time migrate into the core and deprive it of its crunchiness. To avoid this, it is preferred to caramelize the core material by coating it with a sugar to provide a protective barrier to the fats in the outer coatings of chocolate.

The crunchy core is then coated with alternate layers of chocolate and gasified candy.

The chocolate is used in liquid form and may be sweet, semi-sweet, bittersweet or milk chocolate, although milk chocolate is preferred. The chocolate contains about 30–40 wt. % fat and should have a moisture content of 1-2 wt. % or below.

The fats contained in chocolate are essentially made up of cocoa butter. When cocoa butter is replaced with other vegetable fats, a chocolate substitute results.

For example, for a chocolate substitute which can be used in the alternating layers, there can be used a substitute chocolate having the same physical properties and the same taste as chocolate. The chocolate substitute comprises a mixture of vegetable fats, sugar, emulsifiers (for example, soy lecithin) flavored with cocoa powder which imparts chocolate taste to the chocolate substitute.

The chocolate substitute can also have the same physical properties as chocolate without having its taste.

In such case, it comprises the same components as those recited above, but instead of being flavored with cocoa powder, it is naturally or artificially flavored with the taste of fruits or mint and the like.

When a chocolate substitute is used, (which does not have the taste of chocolate) the covering made up of this chocolate substitute is termed a fantasy wrapping or covering.

In a preferred embodiment of the invention, the alternating layer are made up of layers of gasified candy and natural chocolate.

The gasified candy component of the instant confection is conveniently produced according to the process disclosed in U.S. Pat. No. 3,012,893 and discussed hereinbefore. U.S. Pat. Nos. 3,985,909 and 3,985,910 to Kirkpatrick and U.S. Pat. No. 4,001,457 to Hegadorn disclose additional and/or optional details regarding the process of preparing gasified candy. The gasified candy can be prepared from any of the commercially-available sugars employed in the confectionary industry. Thus, such sugars as glucose, fructose, sucrose, lactose, etc. alone or in combination may be employed in practicing the instant invention. A combination of sucrose and lactose provides a preferred product. A mixture of 30% lactose and 70% sucrose gives an excellent gasified hard product particularly characterized by its low hygroscopicity and reduced stickiness on standing. A mixture of sucrose with corn syrup (containing glucose, maltose, dextrin) is also satisfactory. Gases, such as air, nitrogen, carbon dioxide and the like may be used as the gas in the gasified candy; carbon dioxide is preferred. The moisture content of the gasified candy is typically between 1.0 and 5.0%. Preferably, it is between 2.0 and 3.0%. Gasified candy pieces in a variety of sizes may be employed, although its is preferred that the pieces be sieved to produce uniform sized pieces and thus facilitate the coating process. Since the use of larger sized pieces requires the application of thicker coatings of chocolate to completely envelope the gasified candy, smaller sized pieces are preferred. Gasified candy fines, typically −14 to +30 U.S. Sieve Series or −20 to +40 U.S. Sieve Series, can be employed and are preferred. Of course, larger sized pieces (e.g., −4 to +12 U.S. Sieve Series) can be employed.

The confection of this invention may be prepared as follows:

The crunchy material comprising the core (cereal, dried fruit, nuts or mixtures thereof) is caramelized by coating the material with a concentrated liquid sugar solution, a brown sugar solution may be employed. The coating may be achieved by pouring the viscous sugar over the crunchy material or by adding the crunchy material to a vessel containing the liquid sugar. The mixture is worked or agitated until the desired coating of the crunchy material is obtained. The sugary core is then formed into the shape of the final product (viz., ball, bar, etc.) and dried to effect a final moisture content of the core of less than about 4 wt. %. Typically, the sugar comprises about 40 wt. % of the core while the core comprises about 22 wt. % of the final confection (the chocolate coating comprises about 45 wt. % and the gasified candy about 33 wt. %).

Next, alternate layers of chocolate and gasified candy are applied to the core—the first and the final layers, i.e., the innermost and outermost layers, are chocolate. The chocolate coating is applied by dipping the core into a quantity of liquified chocolate (chocolate typically melts at about 37°-38° C.) to wet the core. The gasified candy is then applied to the wet chocolate layer by such means as sprinkling the gasified candy onto the chocolate or by rolling the chocolate coated core in a quantity of gasified candy. Before applying the next layer of chocolate, cool or cold air is passed over the coated core to solidify the wet chocolate layer containing the gasified candy. This procedure is repeated until the desired quantity of chocolate and gasified candy layers are formed on the core. Typically, five layers of each are applied in preparing a bite-sized drop or small ball-sized piece. A final layer of chocolate is then applied to seal in the last layer of gasified candy and this layer is solidified with air. This final layer must be sufficiently thick to provide a protective moisture barrier for the outer layer of gasified candy. It may, therefore, be considerably thicker than the inner layers of chocolate.

Optionally, a final hard coat of edible shellac or varnish, colored if desired, may be applied to the confection.

Packaging the confection of this invention does not require the use of moisture resistant materials as does gasified candy. Although there is a significant amount of water present in the confection, surprisingly the gasified candy remains stable. This, despite the fact that the sugary crunchy core may contain 3-4 wt. % water and the chocolate layers 1-2 wt. % water while 2-3 wt. % water may be present in the gasified candy itself. The chocolate apparently forms a barrier preventing water from reaching the hydrophilic gasified candy which would otherwise cause it to become sticky and lose the entrapped gas. Therefore, paper packaging well known in the candy art can be employed. The form of the confection will determine the exact nature of the wrapping—quantities of small balls or pieces may be packaged in bags of clear plastic or waxed paper while larger balls or bars of the confection may be wrapped individually in similar materials.

The following examples are presented to facilitate an understanding of the invention without limiting it thereby.

EXAMPLE 1

This example relates to the manufacture of a confection conforming to the invention wherein the crunchy center comprises expanded cereals, covered with alternating layers of a fantasy covering flavored with strawberry and gasified candy.

300 gm of expanded cereal, principally comprising a mixture of rice and other conventional additives such as malt, in the form of round pieces of from 3 to 5 mm in diameter are caramelized in a conventional manner employing 1.5 kg sugar and dried by heating. At the end of this operation, 1.4 kg of centers in the form of small balls lightly caramelized on the surface, having a very clear straw-yellow color and processing a residual moisture content of from 1-2% are obtained.

600 gm of the aforementioned centers are then sweet coated with the following formulation

| Lightly caramelized praline centers: | 0.600 kg |
|---|---|
| Gasified (carbon dioxide) candy powder (made up of grains having a size of from 0.841 to 0.470 mm): | 0.860 kg |
| Fantasy covering (strawberry flavored chocolate substitute) (melting point 37-38° C.) | 1.800 kg |
| Glaze | 0.020 kg |

The fantasy covering is melted in a kettle at a temperature of from 40°-45° C. and the centers are placed in a laboratory coating drum (rotating at 20 rpm, diameter of 50 cm).

A layer of the said liquid covering alone, about 80 g, is applied to the centers and evenly distributed to the surfaces thereof due to the movement and the friction of the latter. The said layer is hardened with the circulation of cold air of 20° C., and of a residual moisture of 40%. After about 5 minutes, a second layer is applied in the same way. This procedure of enlargement is continued until 10 succesive alternating layers of fantasy covering and gasified candy, of 80 to 90 gm each, are obtained. The gasified candy is added just after the application of the liquid covering, thus permitting the said power to be evenly distributed and incorporated in the coating of the centers under the influence of this movement. After about 2 minutes, a circulation of cold air at 20° C. hardens this coating containing the gasified candy.

Each sequence corresponding to the application of a layer of fantasy coating and gasified candy powder lasts for about 5 minutes. After incorporating the entire amount of gasified candy, the coating drum is turned for 10 minutes with circulation of cold air to completely harden the wrapping.

The remaining quantity of coating is then added in successive layers of about 80 gm each which are also hardened by circulation of cold air. At the end of the operation, the drum is left to rotate for 10 minutes in order to insure glossy rounded pieces.

The glaze is produced 24 hours later. The glaze composition comprises:

| water | 12% |
|---|---|
| sugar | 32% |
| glucose | 19% |
| strawberry flavored fantasy coating | 8% |
| gumarabic solution | 29% |

The operation is identical to that of enlarging.

The thickness of the coating of the crunchy center is from 2-3 mm and the end product is obtained in the form of small shiny round pieces wherein the diameter is from 8 to 12 mm and which are sizzling and crunchy when eaten.

EXAMPLE 2

This example relates to the manufacture of a confection conforming to the invention wherein the crunchy center is made up of dried cocoa pulp and surrounded with alternating layers of natural chocolate and gasified candy.

The centers represented by pieces of dried cocoa pulp are prepared from the following formula:

| Dried pieces of cocoa pulp (1 to 2 mm long) | 500 g |
|---|---|
| Gasified (carbon dioxide) candy powder made up of granules of a size of 1.41-0.595 mm | 800 g |
| Natural chocolate (melting point 36-37° C.) | 1400 g |
| Glaze | 18 g |

The pieces of cocoa pulp are caramelized in the conventional manner and placed in a laboratory coating drum.

A first layer of chocolate previously melted in a kettle at 37°-38° C. is applied to these centers and hardened by the circulation of air at 20° C. It weighs about 100 g. Thereafter 8 alternating layers of chocolate and gasified candy powder, weighing about 100 g each are successively applied and hardened by the circulation of chilled air. The gasified candy powder is dispersed in the drum while the chocolate therein is still liquid or sufficiently fluid to cover the said powder. The remaining chocolate, i.e., about 500 g, is then used in successive layers of 100 g each hardened by circulation of cold air. Following this enlargement operation, glossing of the product is achieved by allowing the drum to rotate 10 minutes. After 24 hours a glaze is applied to the composition as in Example 1. The product obtained is identical to that of Example 1 except natural chocolate replaces the strawberry flavored fantasy coating. The product obtained is in the form of pieces having a diameter of 4-6 mm possessing a taste of cocoa and chocolate, combined with a sizzling and crunchy effect.

The confection of this invention provides the candy lover with a pleasing combination of organoleptic effects—crunchiness, sizzle and chocolate flavor. The crunchiness is supplied by the inner core, the sizzle from the gasified candy and the chocolate flavor from the layers of chocolate. The combination of these three distinctive effects is most pleasing, pleasant and unusual and is quite unlike that of any other candy or confection. By permitting the confection to dissolve in the mouth, a sustained popping or sizzling is produced as the melting chocolate gradually exposes the gasified candy to the moisture in the mouth. Surprisingly, this tingling effect is significantly more prolonged than that which is experienced when gasified candy is placed in the mouth.

What is claimed is:

1. A confection which comprises:
    (a) a crunchy core selected from the group consisting of cereal, dried fruit, nuts and mixtures thereof, and
    (b) a protective matrix coating formed on said core, said matrix coating comprising alternate layers of chocolate and particles of gasified candy, the innermost and outermost layers of said coating being chocolate, said particles of gasified candy being from −4 to +40 U.S. Standard Sieve.

2. A confection according to claim 1 wherein the chocolate is selected from the group consisting of natural chocolate, a chocolate substitute having the same physical properties as chocolate and the taste of chocolate, a chocolate substitute having the same physical properties without its taste but which possesses a taste of fruit or mint obtained by the use of natural or artificial flavors and mixtures thereof.

3. A confection according to claim 1 wherein the core ingredients are sugar coated.

4. A confection according to claim 1 wherein the cereal is prepared from rice, wheat, corn, oats or barley in expanded, exploded or processed form.

5. A confection according to claim 1 wherein the dried fruit is prunes, raisins or coconut.

6. A confection according to claim 1 wherein the nuts are chestnuts, hazel nuts, peanuts, walnuts, almonds or pecans.

7. A confection according to claim 1 wherein the moisture content of the core is less than about 4 wt. %, of the chocolate is 1-2 wt. % and of the gasified candy is 2-3 wt. %.

8. A confection according to claim 1 wherein the gasified candy is −14 to +30 or −20 to +40 U.S. Sieve Series in size.

9. A confection according to claim 1 having a layer of edible shellac or varnish formed on the outermost layer of chocolate.

10. A method of preparing a confection which comprises:
    (a) forming a crunchy core selected from the group consisting of cereal, dried fruit, nuts and mixtures thereof, and
    (b) applying alternate layers of chocolate and particles of gasified candy to said crunchy core to form a protective matrix, the innermost and outermost layers being chocolate, said particles of gasified candy being from −4 to +40 U.S. Standard Sieve.

11. A method according to the claim 10 wherein the chocolate is selected from the group consisting of natural chocolate, a chocolate substitute having the same physical properties as chocolate and the taste of chocolate, a chocolate substitute having the same physical properties without its taste but which possesses a taste of fruite or mint obtained by the use of natural or artificial flavors and mixtures thereof.

12. A method according to claim 10 wherein the chocolate is liquid and including the following additional steps:
    subsequent to the application of each layer of gasified candy and the final layer of chocolate, cooling the partially completed confection whereby the newly applied chocolate layer is solidified.

13. A method according to claim 10 including the following additional steps, performed prior to step (b):
    coating said crunchy core with a liquid sugar and solidifying said sugar.

14. A method according to claim 10, including the following additional step:
    forming a layer of edible shellac or varnish on said outermost layer of chocolate.

* * * * *

UNITED STATES PATENT AND TRADEMARK OFFICE
CERTIFICATE OF CORRECTION

PATENT NO. : 4,289,790
DATED : September 15, 1981
INVENTOR(S) : Georges Bruelle

It is certified that error appears in the above-identified patent and that said Letters Patent are hereby corrected as shown below:

In column 5, line 49, change "processing" to -- possessing -- .

In column 6, line 6, change "succesive" to -- successive -- ; line 10, change "power" to -- powder -- .

Signed and Sealed this

Twentieth Day of July 1982

[SEAL]

*Attest:*

*Attesting Officer*

GERALD J. MOSSINGHOFF

*Commissioner of Patents and Trademarks*